(12) United States Patent
Barr et al.

(10) Patent No.: US 6,176,138 B1
(45) Date of Patent: Jan. 23, 2001

(54) ELECTRONIC PRESSURE SENSOR

(75) Inventors: Howard S. Barr, Encinitas; Dennis Lehman, Santee, both of CA (US)

(73) Assignee: SABA Instruments, Inc., Encinitas, CA (US)

(*) Notice: Under 35 U.S.C. 154(b), the term of this patent shall be extended for 0 days.

(21) Appl. No.: 09/115,712

(22) Filed: Jul. 15, 1998

(51) Int. Cl.[7] .................................................. G01L 7/00
(52) U.S. Cl. ............................................................. 73/756
(58) Field of Search ................................ 73/726, 727, 721, 73/756, 700–708, 715–20, 724

(56) References Cited

U.S. PATENT DOCUMENTS

| | | |
|---|---|---|
| 3,875,802 | 4/1975 | Garnett et al. . |
| 4,702,102 * | 10/1987 | Hammerton ............................... 73/19 |
| 4,765,188 * | 8/1988 | Krechmery et al. .................... 73/708 |
| 4,879,903 | 11/1989 | Ramsey et al. . |
| 4,942,383 | 7/1990 | Lam et al. . |
| 4,951,236 | 8/1990 | Kawate et al. . |
| 5,315,877 | 5/1994 | Park et al. . |
| 5,511,427 * | 4/1996 | Burns ...................................... 73/708 |
| 5,554,113 | 9/1996 | Novak et al. . |
| 5,581,226 | 12/1996 | Shah . |
| 5,880,372 * | 3/1999 | Nasiri ..................................... 73/726 |
| 5,927,240 * | 7/1999 | Maxon .............................. 123/179.3 |

* cited by examiner

*Primary Examiner*—Benjamin R. Fuller
*Assistant Examiner*—Abdullahi Aw-musse
(74) *Attorney, Agent, or Firm*—Donn K. Harms

(57) ABSTRACT

An electronic pressure sensor is described that includes a hollow stainless steel insert within a plastic outer housing. A piezoelectric pressure sensor is mounted to one end of the insert while the media to be measured flows into the other end. The insert protects the plastic outer housing from the pressure of the media. A microcontroller reads a digital signal from the pressure sensor and converts the signal into a digital output such as RS-232 or RS-485.

22 Claims, 6 Drawing Sheets

ELECTRONIC PRESSURE SENSOR

FIELD OF THE INVENTION

This invention relates to pressure sensors. More specifically, this invention relates to electronic pressure sensors having integrated microcontrollers.

BACKGROUND OF THE INVENTION

One of the most popular uses of silicon micromachined sensing technology has been in the field of pressure sensing. Here, whether in the automotive, industrial control, or medical marketplaces, piezoresistive sensing technologies have solved many vital pressure sensing problems as well as created new applications.

One popular type of pressure sensor is mounted to a pipe-thread so that it can be easily fastened into a matching threaded fitting. Because these sensors are capable of being mounted in any standard pipe fitting (typically ⅛ or ¼ inch NPT), they can mate directly to the pressure source or pressure-carrying line or pipe to directly measure the pressure of a media. The media to be measured can be a gas such as air, natural gas, oxygen, nitrogen or any other gaseous composition. In addition, the measured media can be a pressurized liquid such as water, oil, gasoline or any other liquid solution. The pipe-threaded form factor has led to a group of products assuming a similar design and construction. These sensors are typically constructed of stainless steel so that they can withstand high media pressures without cracking or leaking when subjected to high pressures.

In conventional pipe-fitted sensors, one end is normally a hollow, cylindrical, threaded tube, that is adapted to mount into a threaded pipe fitting. The other end of the sensor is normally an enclosed cylindrical tube that houses the silicon pressure sensor and its substrate. Separating the sensor from the media, whose pressure is to be measured, is normally a flexible stainless steel membrane bound to the inside of the stainless steel tube, near the sensing element. An oil is typically placed in the region between the flexible membrane and the sensor so that the pressure of the media is transferred through the oil to the sensing element. In this manner, the sensor device is physically separated from the media being sensed under pressure.

Although this construction provides several advantages, many disadvantages are also present. While conventional stainless steel pressure sensor bodies are normally strong enough to withstand pressures of approximately 5–10,000 PSI, they are also expensive to manufacture. Thus, the cost of manufacturing a stainless steel pressure sensor is higher than it might be if the body was made of a less expensive material.

Another facet of modern electronic pressure sensors is their mechanism for communicating with other devices. A typical sensor either displays information, or transmits information to an external device, such as a computer. The output of the sensing element is processed into a particular format for communicating with external devices whether or not the sensing element is based on a capacitive or piezoresistive element. Typically, the weak signals generated upon detection of pressure changes on the sensing element are amplified before being transmitted to an external device. Many vendors have provided various systems for amplifying signals generated from the sensor. Generally, however, the sensor outputs can be categorized by three typical output formats:

1. Unamplified—The unamplified signal is transmitted to another assembly which processes the signals (e.g. 0–50, 0–100 mV Out)
2. Voltage Out—A voltage is generated which is an amplified output of the basic sensing assembly (e.g. 0–5, 1–6 Volts Out)
3. Current Out—A current is generated which is proportional to the output signal of the sensing element. (e.g. 4–20 ma Out)

However, because each of these sensors produce an analog output, if digital processing is required by the external device, at least one further analog to digital conversion is required. Performing this conversion is disadvantageous because it adds complexity and cost to the sensor design.

As with many silicon micromachined sensors, detection characteristics of the sensing element and the other electrical components mounted in its assembly vary with temperature. Although temperature variations can cause both sensitivity and offset changes, they can easily be measured, and compensated for during thermal testing of the sensor. Typically, the problems associated with these offset and sensitivity changes have been addressed in two ways. First, laser trimming compensation resistors have been used in the past to compensate offset and sensitivity variations of the bridge with temperature. This is achieved by trimming (using a laser, for example) a set of resistors which can be attached to various points of the bridge, which over temperature, will compensate the change of resistance of the silicon resistors of the piezoresistive bridges. This process requires temperature cycling the sensor, then trimming those resistors to counteract the temperature coefficients of the silicon resistors which make up the piezoresistive bridge.

The second technique is a more recent approach which utilizes digital and analog circuit techniques to modify the output signals according to the temperature characteristics of the specific sensor. These techniques have been incorporated in current Application Specific Integrated Circuits (ASICs) where temperature coefficients are stored digitally then input to analog circuits which provide offsets and gain adjustments when temperature changes are detected by the sensing element.

While the previously described technology has provided the marketplace with some solutions to their pressure sensing needs, significant disadvantages remain for many applications. For low cost automation applications, an integrated sensor solution should be inexpensive, easy to manufacture and test, provide direct digital outputs for direct computer interfacing and be field programmable or reprogrammable for flexibility in the processing network.

The stainless steel-signal conditioned sensors in the marketplace do not meet these requirements. First, manufacturing sensors with stainless steel body and welded stainless membranes remains a costly process. Testing products that incorporate temperature compensation is complicated due to the complexity of laser trimming and its inherent yield issues. Those sensors which use Application Specific Integrated Circuits (ASICs) to adjust pressure offsets and gains as a function of temperature using internal digital to analog circuitry can require an external programmer to modify the results or reprogram an internal memory. Most commercially available ASICs generate an analog signal, while the laser trimmed devices require separate analog amplification. To generate digital signals, both types of units still require a digital to analog converter.

Thus, what is needed in the art is a sensor device that can withstand high pressure media, while being economic to produce. In addition, the art needs an electronic sensor that can directly provide a temperature compensated digital output to external devices. The present invention provides such a system.

SUMMARY OF THE INVENTION

One embodiment of the invention is a sensor for detecting the pressure of a media. The sensor includes: an outer housing; a hollow insert located inside the outer housing, wherein the hollow insert has a first end and a second end; a pressure sensor mounted to the first end of the hollow insert for measuring the pressure of the media flowing into the second end; and a microcontroller in communication with the pressure sensor for reading the measured pressure and outputting a digital signal.

Another embodiment of the invention is a sensor for detecting the pressure of a media. In this embodiment, the sensor comprises: an outer housing; a metallic hollow insert located inside the outer housing, wherein the hollow insert has a first end and a second end; and a pressure sensor mounted to the first end of the hollow insert for measuring the pressure of the media flowing into the second end.

Still another embodiment of the invention is a sensor for detecting the pressure of a media. The sensor includes: an outer housing; a hollow insert located inside the outer housing, wherein the hollow insert has a first end and a second end; a pressure sensor having a front side and a back side, wherein the front side is in fluid contact with the first end of the hollow insert; and a printed circuit board having a microcontroller and being mounted to the back side of the pressure sensor.

Yet another embodiment of the invention is a method in an electronic pressure sensor for measuring the pressure of a media. The method includes the steps of:measuring the pressure of the media; outputting an analog signal indicative of the measured pressure from a pressure sensor to a converter; converting the analog signal from the pressure sensor to a digital signal indicative of the measured pressure; transmitting the digital signal to a microcontroller; and converting the digital signal to a predetermined digital output format.

One other embodiment of the invention is an electronic pressure sensor for measuring the pressure of a media, comprising: means for measuring the pressure of the media; means for outputting an analog signal indicative of the measured pressure from a pressure sensor to a converter; means for converting the analog signal from the pressure sensor to a digital signal indicative of the measured pressure; means for transmitting the digital signal to a microcontroller; and means for converting the digital signal to a predetermined digital output format.

DETAILED DESCRIPTION

The following detailed description presents a description of certain specific embodiments of the invention. In this description, reference is made to the drawings wherein like parts are designated with like numerals throughout.

For convenience, the discussion of the invention is organized into the following principal sections: Introduction, Mechanical Overview, Electronics Overview and Software Overview.

Introduction

This invention relates to sensors that solve many of the aforementioned problems. These sensors can be made from a low cost thermoplastic material, yet still retain the strength of the prior stainless steel sensors. To provide this result, embodiments of the invention include pressure sensors having an insert adapted to fit within a plastic outer housing.

The insert can be made of a high tensile strength material such as aluminum, so that the sensor can be placed under high pressure without damage. Placing the insert within the sensor body allows a variety of metals or plastics to be used as the fluid path and main pressure vessel material. For rugged higher pressure applications, a stainless steel insert within a plastic outer body can be provided. For lower pressure applications, requiring less ruggedness but more chemical resistance, a Polyvinyl chloride (PVC) plastic outer body having an insert constructed of nylon might be used to provide the advantages described herein. In either case, the design of the sensor system allows various outer body and internal insert materials to be chosen to maximize the performance and cost effectiveness of the sensor.

Other embodiments are defined by the types of housing surrounding the pressure sensor. In one embodiment, an insert connected to a cylindrical ceramic mullite tube which surrounds the pressure sensor isolates the ceramic substrate from the plastic body. Since many plastic materials change size in response to temperature changes, rigidly mounting the sensor in the plastic material can stress the ceramic substrate as the plastic moves. By attaching the insert to the mullite piece of the sensor, the pressure chamber, which is essentially the insert and body wall, remain connected to the sensor yet allow the substrate to "float" as the plastic changes over temperature. In one embodiment, the extruded mullite component could be extended to form an insert itself. In this case the insert becomes the mullite.

Figure 1:
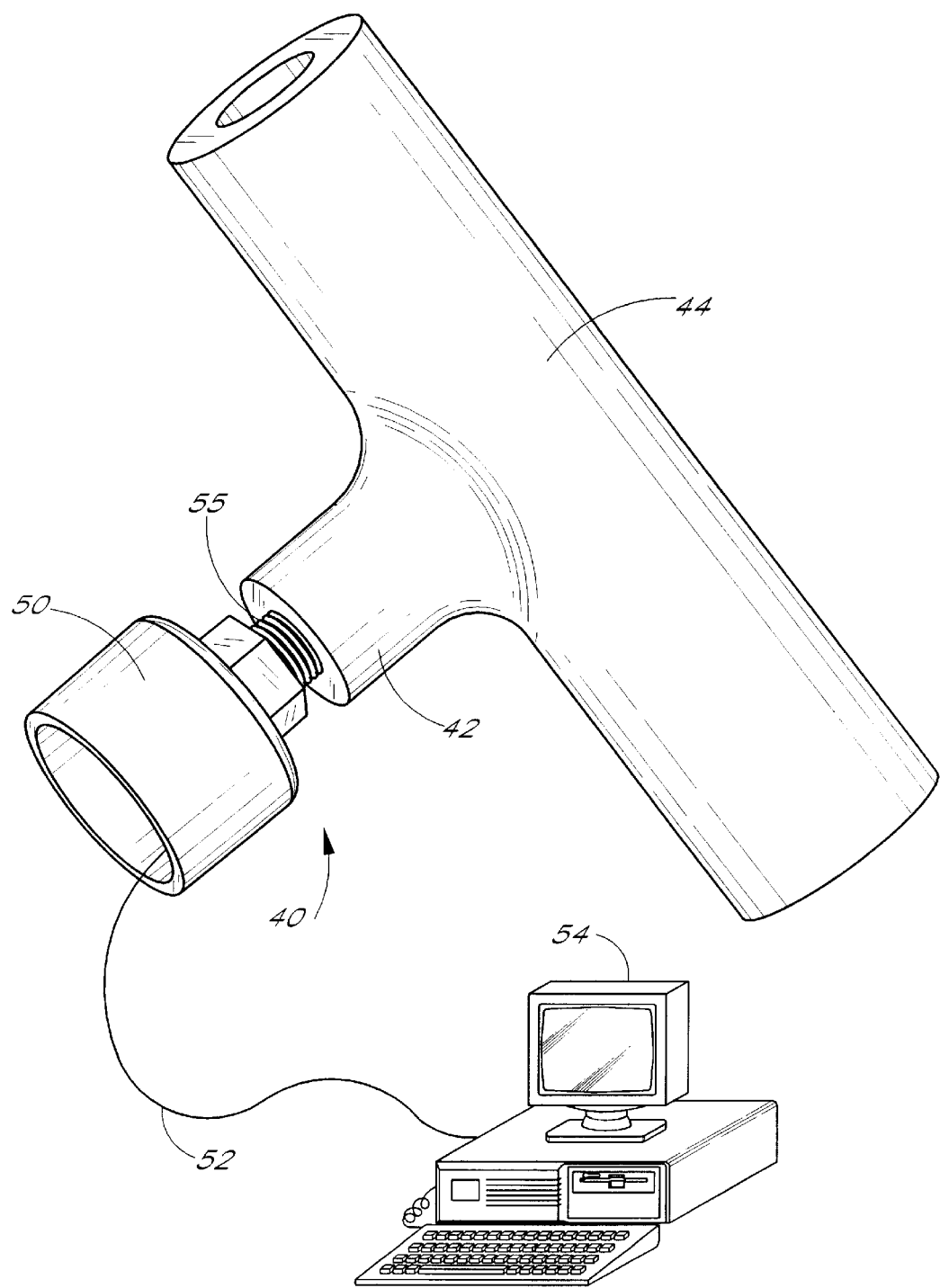
FIG. 1 is a perspective view of one embodiment of an electronic pressure sensor mounted on a water pipe.

FIG. 1 provides an illustration of one embodiment of a pressure sensor 40 in a typical application. As shown, the sensor 40 is screw-mounted into a mating receptacle 42 on a pipe 44. The electronics of the sensor 40 are mounted into a widened portion 50 of the sensor 40. A cable 52 connects the sensor electronics with a computer 54. The sensor 40 mounts to the mating receptacle 42 at a threaded end 55 so that the pressure of media in the pipe 44 can be measured with the sensor 40.

Due to its simplified assembly, the sensor is simple and inexpensive to manufacture and test. In one embodiment, the electronics are integrated within the sensor housing and contain an onboard temperature sensor and microcontroller so that the pressure sensor can be programmed to compensate for any temperature offsets. With this embodiment, testing is simplified because the results of the test data can be directly loaded into the pressure sensor for temperature coefficients and offset calculations. The yield of accurate pressure sensors during production is increased because the temperature compensation data can be reprogrammed at any time. In addition, in some embodiments re-testing the pressure sensors is simple and easy way to perform due to an on-board microprocessor.

A digital processing core in some embodiments of the invention provides a straightforward path to providing digital output signals to external devices. Although analog outputs are available, communication between the sensor and external devices is possible in asynchronous half duplex modes. The digital output is also compatible with direct digital displays and wireless communication systems. This is possible via the sensing module design described below.

By including an on-board microcontroller, excitation source, and processing electronics, a sensing module within the pressure sensor can generate output signals indicative of a result (e.g. the pressure being measured) without the necessity for further digital processing. Due to the on-board programmable microcontroller, the pressure data can be presented to the user in a variety of formats such as RS-485, RS-232, wireless or infrared. In contrast, prior sensor systems require intervention by other computers or processing sources in order to provide the proper output to a user. Thus, these prior systems were more complicated and expensive to monitor and maintain.

Mechanical Overview

Figure 2:
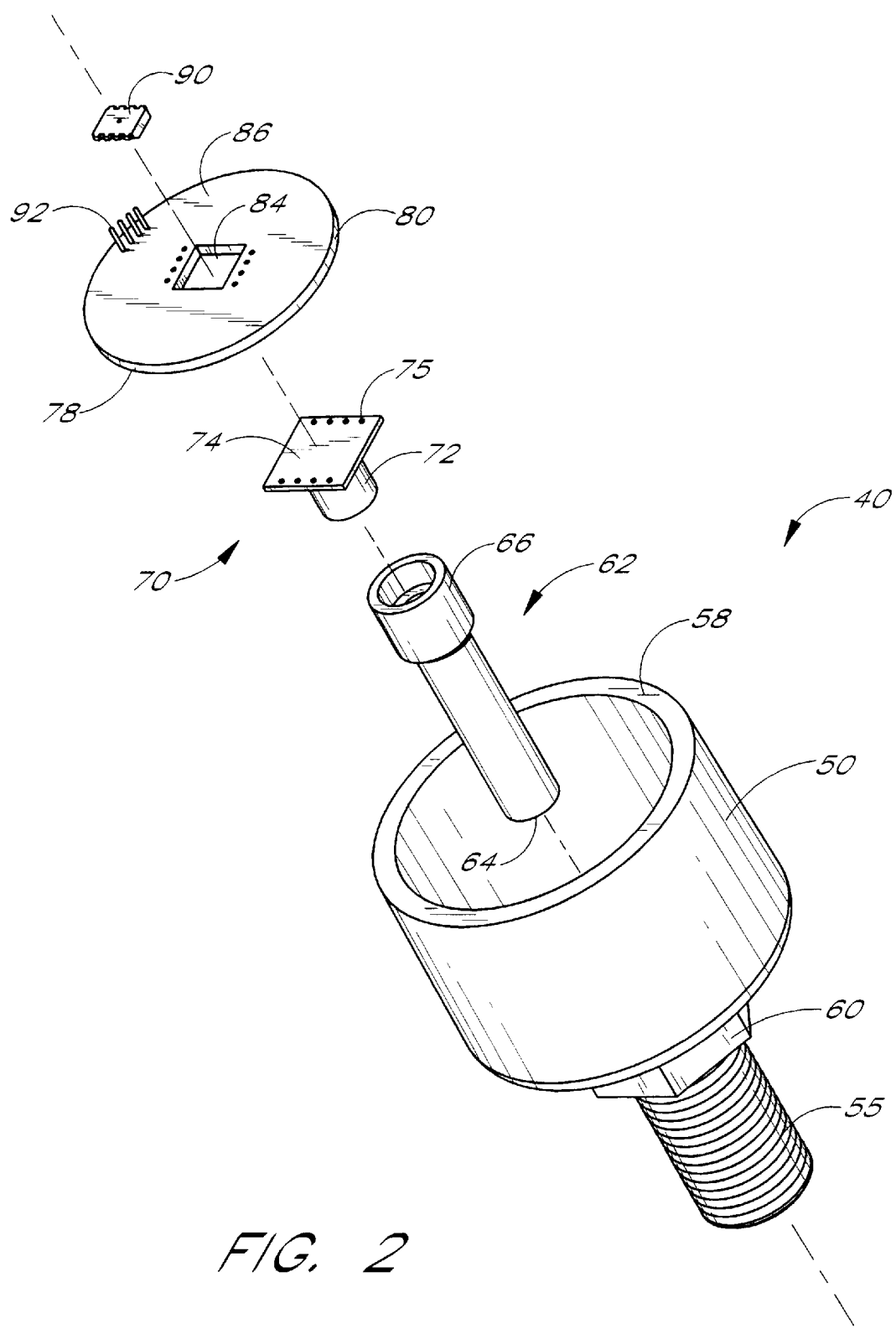
FIG. 2 is an exploded view perspective of an embodiment of the electronic pressure sensor.

FIG. 2 illustrates an exploded view of a sensor assembly 40. The sensor assembly includes the bell-shaped main body 50 and threaded end 55. The main body 50 has an open end 58. The threaded end 55 is adapted to be screw-mounted into a matching receptacle 42 (FIG. 1). A hexagonal fastening nut 60 is formed in the thermoplastic between the open end 58 and the threaded end 55. The main body 50 can be made from any type of high tensile strength light weight material such as a polymer. Thermoplastic polymers, such as ULTEM 2300 (General Electric Plastics, Pittsfield, Mass.) are one preferred type of high tensile strength material.

As shown in FIG. 2, a tubular insert 62 is adapted to slide inside the threaded end 55 of the main body 50. The insert 62 has a narrow end 64 and a widened end 66. The narrow end 64 is machined so that it will fit snugly within a matching tubular opening (not shown) in the interior of the threaded end 55. The interior diameter of the narrow portion 64 is adapted to allow the sensed media (air, water, etc.) to flow toward the widened end 66. The insert 62 is preferably made from a lightweight, strong material such as stainless steel, aluminum or titanium.

Mounted within the widened end 66 of the insert 62 is an electronic pressure sensor 70. The pressure sensor 70 has a cylindrical portion 72 that houses an electronic pressure sensing element (not shown). Thus, the pressure of any media that contacts the interior of the cylindrical portion 72 is sensed to determine its pressure. The cylindrical portion 72 is affixed perpendicular to a contact board 74 having electrical contacts 75. The electronic pressure sensor element (not shown) mounted inside the cylindrical portion 72 of the pressure sensor 70 will produce an analog signal that can be received by connection to the electrical contacts 75.

In this embodiment, the pressure sensor 70 is preferably a surface mountable hybrid pressure sensor, type SMD, manufactured by Sentir, Inc. (Santa Clara, Calif.). The cylindrical portion 72 of the pressure sensor 70 is preferably a cut mullite extruded tube bonded to the surface of the ceramic sensor. One type of mullite extruded tube is manufactured by the Coors Ceramic Company (Golden, Colo.). Within the cylindrical portion 72, and disposed on top of the sensor element, is a dielectric gel capable of protecting the electrical connections on the surface of the pressure sensor substrate from a variety of liquid and gaseous media. One such dielectric gel is the Flurogel™ Q3-6679 dielectric gel made by Dow Corning (Midland, Mich.).

When the threaded end 55 is mounted into a pipe, the media being sensed is drawn into the narrow end 64 of the insert 62. The pressure of the media is sensed by the pressure sensor 70 and an analog signal is generated to one or more of the electrical contacts 75 on a contact board 74. Preferably, the contact board is made of ceramic. As can be imagined, the insert 62 is machined so that the opening into the narrow end 64 becomes flush with the opening of the threaded end 55 when the sensor assembly 40 is assembled. This configuration essentially creates an inner metallic chamber to the main body 50, consisting of the insert 62 and the pressure sensor 70. Because the pressurized media remains within the insert 62, the plastic main body 50 is not exposed to the pressure exerted by the media. Accordingly, the main body 50 is never placed under any pressure. Thus, the main body 50 can be made of a less expensive material than that required in previous pressure sensors.

The electronic contacts 75 on the contact board 74 of the pressure sensor 70 are surface mounted through conventional means to the lower side 78 of a circular printed circuit board 80. A central opening 84 in the printed circuit board 80 exposes the contact board 74 to an upper side 86 of the printed circuit board 80. A temperature sensor 90 is mounted upside down on the upper side 86 of the printed circuit board 80 so that it contacts the contact board 74 of the sensor 70 through the opening 84. A thermally conductive gel is provided between the contact board 74 and the temperature sensor 90 to insure excellent thermal contact.

This intimate contact of the temperature sensor 90 and the pressure sensor 70 provides a means for accurately determining the temperature of the pressure sensor 70 so that temperature compensation calculations can be made to determine the sensed pressure with the highest accuracy. Once the printed circuit board 80 is soldered to the sensor 70, any remaining printed circuit boards or devices are connected to the assembly via a set of header pin is 92 on the upper surface 86 of the printed circuit board 80. Wires or connectors from external devices connect with the printed circuit board 80 to provide power and transmit data. Once an assembly is made, the open end 58 is filled with potting material or another similar compound to seal the electronics and inner sensor assembly together.

The potting material fills the voids in the open end 58 of the main body 50. In order to prevent the stiffer potting material from interfacing directly to the sensor, a flexible silicone rubber compound, such as General Electric's TC3331 Silicon Rubber (General Electric Silicones, Waterford, N.Y.) can be placed between the potting material and the sensor. This silicon rubber material provides a flexible, yet thermally conducting fill between the silicon temperature sensor 90 and the pressure sensor element 70, and protects the sensor from direct contact with the potting material. If desired, the silicon rubber material can be used in place of the potting material, thus making the fill entirely one material.

It should be noted that the design of the main body 50 is specific to the design of the sensor 70. Although the sensor 70 is normally mounted to the stainless steel insert 62, the main body 50 can be designed to handle the pressure of the media being measured to guarantee mechanical integrity of the unit in case of central core leak. The current embodiment is designed to operate continuously at 500 PSI, without the insert 62 in place. Non-continuous operation of the sensor assembly 40 is specified to 1000 PSI, with the burst strength at 1500 PSI. For these reasons, the polymeric main body 50 should maintain the shape described. It should be noted that even though the insert 62 can improve the operating range significantly, the sensor assembly can be made with the appropriate wall thickness and geometry to withstand a high pressure in case the insert is ever damaged.

Bonding the sensor assembly 40 together helps guarantee that the major mechanical components will act in concert with one another. The stainless steel insert 62 can be bonded to the inner surface of the threaded stem 55 using an adhesive compatible with stainless steel and ULTEM surface. One type of adhesive is the Master Bond EP21HT Adhesive (Master Bond, Hackensack, N.J.). The sensor's cylindrical portion 72 can be bonded to the inner surface of the widened portion 66 of the insert 62 using the same adhesive. Potting, performed after the assembly is complete, can be achieved using a potting material such as Fel-Pro ResTech 225/206 Epoxy (Fel-Pro, Commerce City, Colo.).

Figure 3:
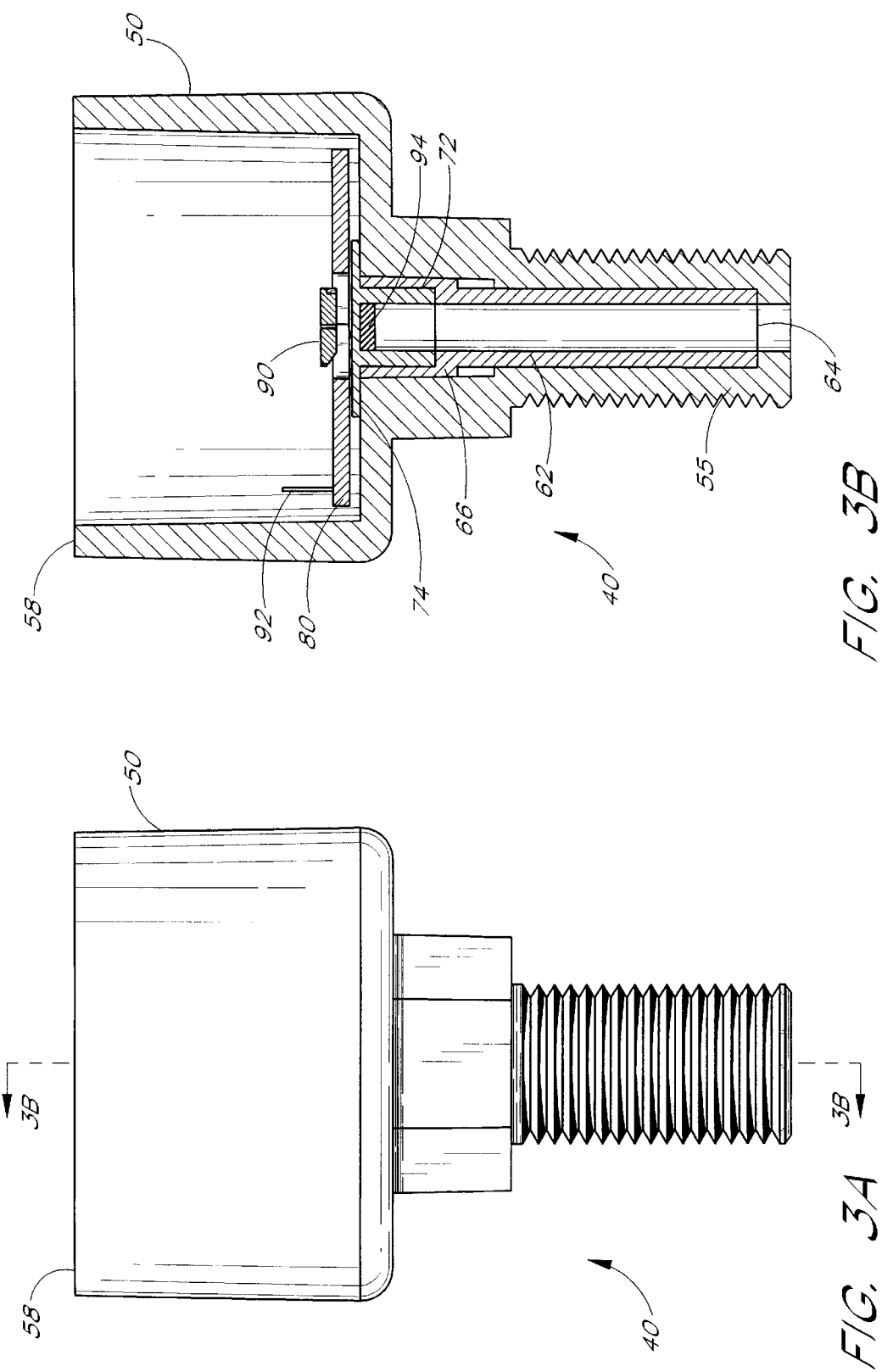
FIG. 3A is a perspective view of an embodiment of an electronic pressure sensor.
FIG. 3B is a cross-sectional view of an embodiment of the electronic sensor taken along line 3B—3B of FIG. 3A.

FIG. 3A is a perspective view of one embodiment of an assembled electronic pressure sensor assembly 40. FIG. 3B illustrates a cross-sectional view of an assembled electronic pressure sensor 40 in accordance with the present invention. This view is seen as taken along line 3B—3B of FIG. 3A. As shown, the widened area 66 of insert 62 mates with the cylindrical tube 72 of sensor assembly 70. A piezoelectric pressure element 94 is shown inside the cylindrical tube 72. The pressure element 94 actually senses the measured pressure and transmits an analog signal to a microcontroller on the printed circuit board 80.

A bonding material is used to ensure a fluid tight and mechanically stable bond between the sensor element 70 and insert 62. When assembled, the contact board 74 rests on the inside surface of the main body 50 with the circuit board 80 suspended in the main body. In contact with the pressure sensor element 70 is the temperature sensor 90 that has been soldered to the upper surface 86 of the printed circuit board 80. Wires or other electronics (not shown) are attached to the sensor system via the header pins 92. When all electronic assembly is complete, the main body 50 is thereafter filled with a potting material.

Electronics Overview

Figure 4:
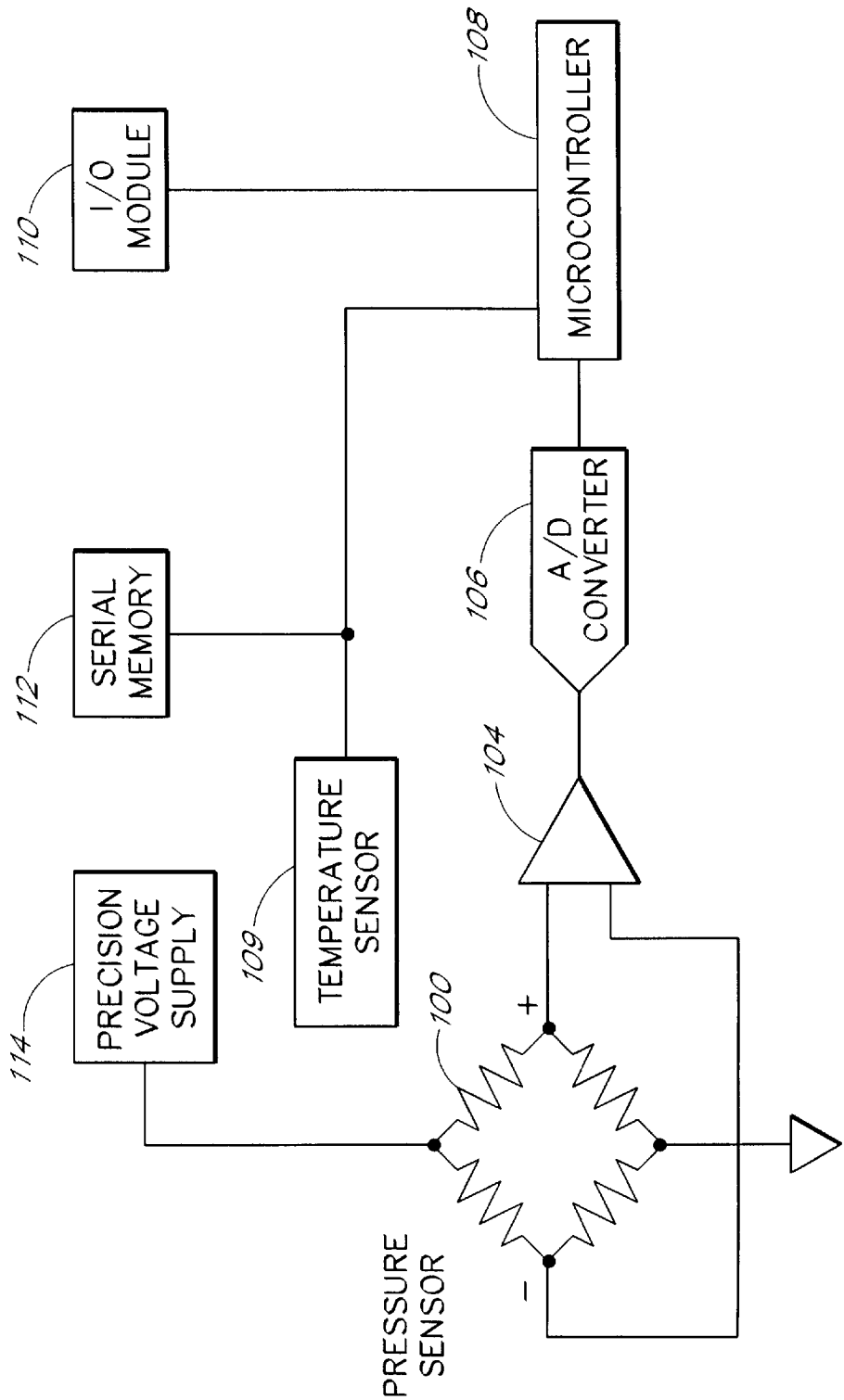
FIG. 4 is a block diagram illustrating one embodiment of the sensor module electronics.

One embodiment of the sensor electronics is illustrated in FIG. 4. As described previously, the system provides a single stage amplification of the pressure measurement and a direct analog to digital conversion. Due to the self-contained system approach, via an on-board system microcontroller, all offset and sensitivity corrections due to temperature can be performed in software or firmware. This allows the offsets and correction factors to be changed via programming after the sensor device is assembled. In addition, since the temperature sensor is in direct communication with the pressure sensor, a more accurate temperature compensation can be calculated. In FIG. 4 the pressure sensor is represented by the use of a piezoresistive pressure sensor 100, although other types of sensors, such as capacitive sensors could be used without departing from the spirit of the invention.

Referring to FIG. 4, a piezoresistive sensor circuit 100 is excited using a precision voltage supply circuit 114. One type of voltage supply is a Burr-Brown (Tucson, Ariz.) INA125 integrated circuit, including a precision voltage source and an instrumentation amplifier with a programmable gain. When the sensor circuit 100 is excited to approximately 5 Volts, via the voltage supply circuit 114, the plus and minus terminals of the sensor circuit 100 output approximately 2.5 volts each. When pressure is applied to the sensor circuit 100, the pressure is registered by the voltage difference of the sensor output without pressure and the sensor output with the pressure. This voltage difference is then amplified by an instrumentation amplifier circuit 104 in the Burr-Brown INA125 circuit. The amplification gain can be set by an external resistor to the INA125 circuit and may depend on the dynamic range of output voltages desired across the operating pressure range.

Once the analog signal from the sensor circuit 100 is amplified by the amplifier circuit 104, its output is converted to a digital format via a Burr-Brown ADS-1286 12-bit Analog to Digital (A/D) converter circuit 106. The raw twelve bit digital signal coming from the A/D converter is then input to a controlling microcontroller circuit 108. One preferable type of microcontroller is a MICROCHIP PIC12C509 (Microchip, Chandler, Ariz.), although other similar microcontrollers can be substituted by those skilled in the art.

In order for the microcontroller circuit 108 to most accurately process the raw sensor signal, the external temperature of the sensor should be known so that pressure sensitivity and offset changes as a function of temperature can be calculated and used to adjust the raw sensor signal. While it would be possible to determine the pressure without calculating a temperature offset, pressure value would not be as accurate. To measure the temperature, a National Semiconductor Corporation (Santa Clara, Calif.) LM75 $I^2C$ digital temperature sensor circuit 109 is mounted on the printed circuit board upside down (and in the opening) so that the temperature sensor body contacts the bottom of the pressure sensor 70. Any temperature coefficients output from the temperature sensor circuit 109 are stored in a serial memory circuit 112 such as the Microchip 24LC01B, or in the memory of the microcontroller circuit 108. These coefficients can be obtained during part testing and thereafter stored in memory during assembly of the pressure sensor 40.

Figure 5:
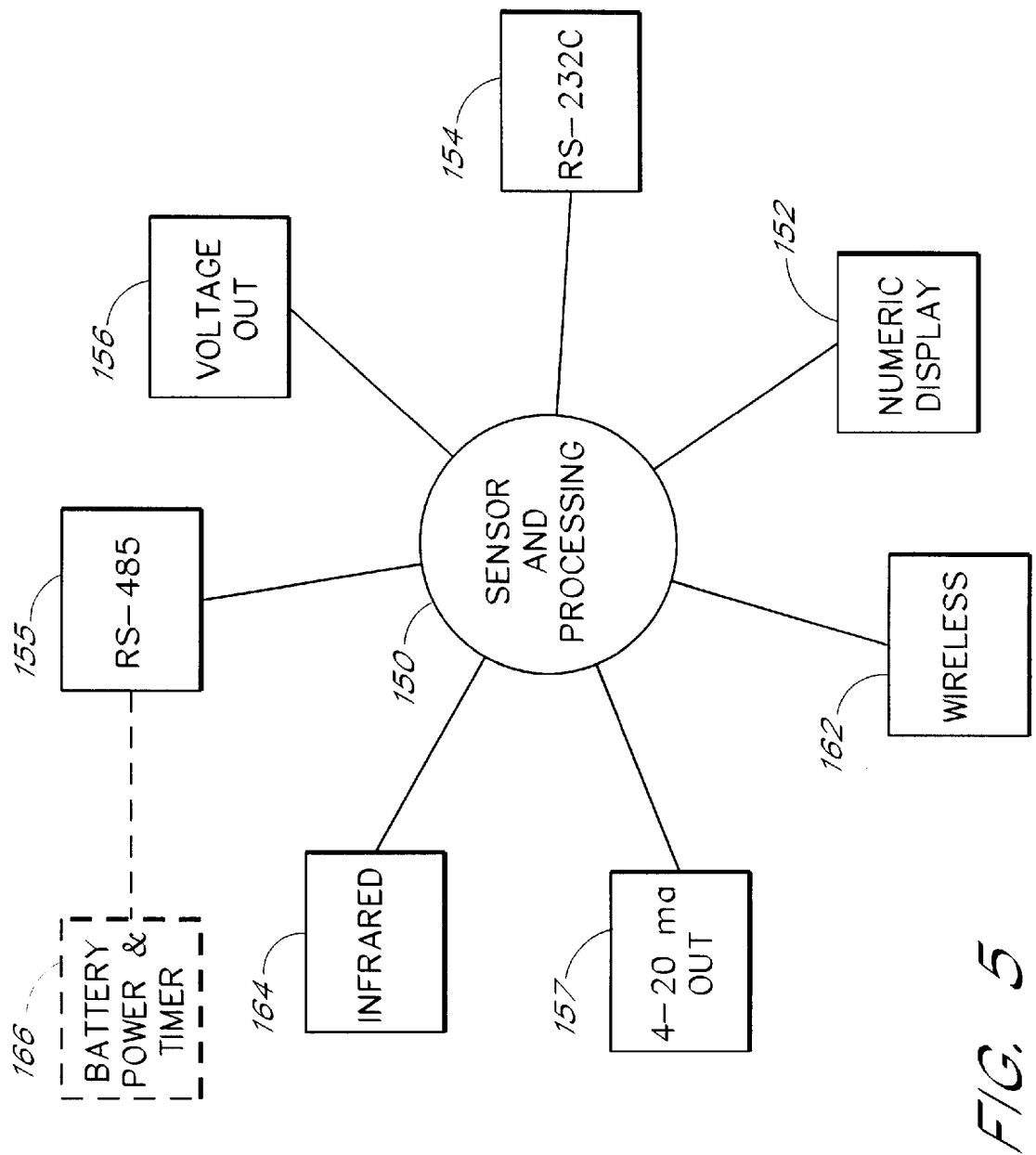
FIG. 5 is block diagram illustrating one embodiment of a sensor module input/output system.

In order to send the pressure measurement to other devices, various Input/Output (I/O) modules 110 can be linked to the microcontroller circuit 108. A block diagram of the input/output control flow is shown in FIG. 5. As shown, a sensor and processing system 150 are linked to various inputs and output modules. One output from the sensor and processing system 150 is a numeric display 152 that can display a measured pressure.

In order to display a measured pressure, the main microcontroller 108 communicates with a Microchip PIC16C56 which is utilized as a display driver for a Hewlett-Packard (San Jose, Calif.) HCMS2902 Dot Matrix LED display. This embodiment can be replaced with a variety of LCD Dot Matrix displays, small graphic displays, bar graphs, etc. The display can be any standard LED or Liquid Crystal display known in the art.

For users requiring digital serial output, a standard RS-232C output 154 or RS-485 output 155, can be provided by the microcontroller 108 within the sensor and processing system 150. In the current embodiment, the microcontroller 108 drives a National Semiconductor DS3695 RS-485 Driver/Receiver to provide the RS-485 output 155. For RS-232 formats 154, a Linear Technology LTC1383 dual RS-232 Transmitter/Receiver integrated circuit is used in conjunction with a Toshiba (Toshiba America Electronic Components, Sunnyvale, Calif.) 7H241 to receive and transmit RS-232 signals. In addition, other formats such as the Echelon® communication protocols as adopted by Toshiba and Motorola, Inc. (Chandler, Ariz.) in their microcontroller implementations 3120 and 3150 could also be adopted.

Alternatively, a standard voltage output 156 can be provided wherein the voltage output corresponds to a pressure. For example, using a 5 PSI sensor with a sensitivity of 1 V/PSI would produce a 0–5 Volt output. This type of voltage output scheme can be designed with a Microlinear (San Jose, Calif.) ML2330 Dual DAC and a Linear Technology (Milpitas, Calif.) LT1368 operational amplifier by those of skill in the art. By constructing a voltage summer using the two DAC outputs and one amplifier of the LT1368, 8-bit resolution voltage outputs are possible across a variety of output ranges.

The voltage output 156 can also function as a voltage input to a current output source 157. This combination designed to serve the standard 4–20 ma requirements (4 ma=0 PSI, 20 ma=Maximum PSI), is easily configured by using the voltage source described above, then inputting the signal to a voltage to current converter using the other operational amplifier in the LT1368 package.

This is achieved in two parts. First, the voltage summer mentioned previously, using the two DAC outputs and one-half of a LT1368, form a variable voltage source lor a voltage to current converter. By using the other half of the LT1368, the voltage source creates a computer programmable, voltage controlled, current source by utilizing a standard voltage-to-current conversion technique which compares voltages on the amplifier's positive (+) and negative (−) inputs. In this scheme, one terminal of the amplifier senses the voltage across a sense resistor in the path of the current source, while that voltage is compared to the applied voltage on the other terminal of the amplifier.

Additionally, a wireless data link 162, can be linked to the sensor and processing system 150 so that an asynchronous data set is sent to a receiver which then can process the signal, outputting the digital pressure reading to a computer or hand held terminal. This embodiment can be achieved using a DVP, Inc. (Glendale, Calif.) TX303AT transmitter and appropriate receiver. These circuits normally operate at 303 MHz and permit transmitting data rate to 5000 bits/second. Here, the microcontroller 108 drives the TX303AT which is received by the appropriate electronics. Other embodiments can are envisioned which use other frequencies and data rates.

For example, if optical data links are required for operation, an infrared data link 164 can replace the wireless 303 MHz radio frequency link. By using an infrared (IR) transmitting diode, such as the Hewlett Packard (Cupertino, Calif.) HSDL-4320, one can transmit an identically formatted infrared signal (at 880 nm) which contains the desired data. This asynchronous signal is then be processed similarly to the data discussed above. By simply driving the IR LED at the appropriate current (e.g. 75 ma) using a standard MOSFET transistor, the diode will generate enough optical radiation for line of sight data transmission applications It should also be noted that the migration of this electronics package to a hybrid or large mixed signal ASIC is possible. Since the core of the electronics is the main microcontroller 108, supply 114, instrumentation amplifier 104, and analog to digital converter 106, these devices could be configured as the central unit with any output option being the only electronic variable in the system.

One further adaptation includes the addition of a battery power unit 166. This unit allows digital communication on a regularly scheduled time sequence via a specialized timer chip and standard RS-485 transceiver 155. Using a Seiko Instruments USA (Torrance, Calif.) S-3530A I$^2$C bus Real Time Clock, the main sensor and processing system 150, will be powered on at programmed time periods via the S-3530A clock and the voltage provided by the battery power. In turn, the microcontroller 108 will obtain a measurement, broadcast the measurement via the RS-485 output 155, then power off the unit by reprogramming the S-3530A alarm feature. This feature is possible because of the stand-alone capability of the electronics described in FIGS. 4 and 5.

Software Overview

Flow

Figure 6:
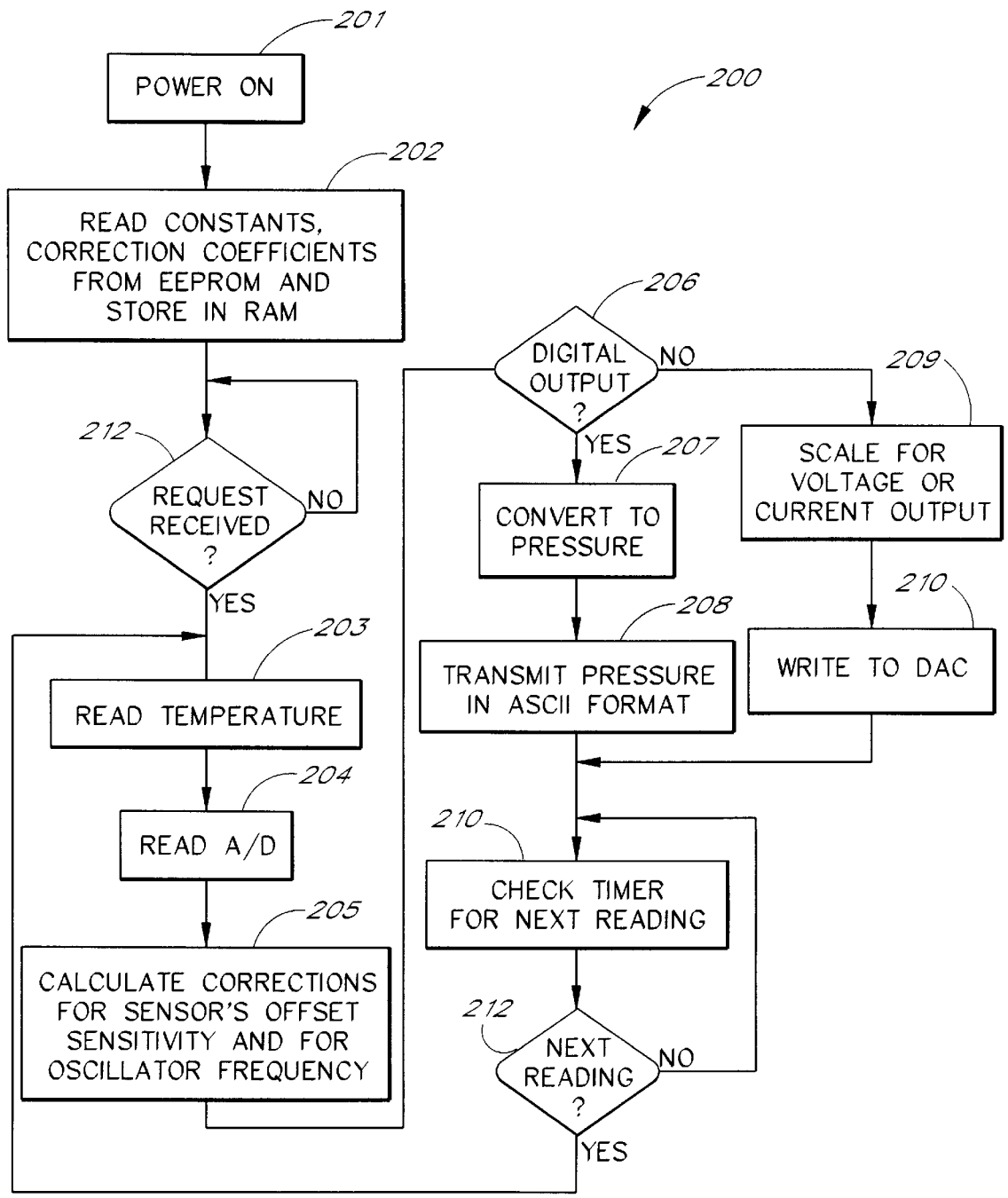
FIG. 6 is a flow diagram illustrating software control in a sensor module.

FIG. 6 is a flow diagram illustrating the overall software process 200 of the electronic pressure sensor system. The process 200 begins at a Power-On/Reset state 201 wherein the microcontroller 108 is either given power or reset. The process 200 then moves to a state 202 wherein numeric configuration data, including coefficients and constants, are read. This configuration data is used to decode the temperature and sensor data from the sensors. The data can be read via the pressure sensor's own internal non-volatile memory or from the serial EEPROM 112.

The configuration data can relate to both analog and digital signals being input into the sensor. In addition, the configuration data can hold a flag indicating the desired format of the output data. For example, the configuration data might specify that the data should be output in a RS232 format. In systems having multiple sensors, a sensor address of a sensor could also be read from the configuration data.

Once the configuration data is read at the state 202, the process 200 moves to a decision state 212 and determines if any requests to read the current pressure have been received. If no requests have been received, the process 200 loops until a decision is made that a request to read the pressure data has been received.

After a request to read the pressure sensor data has been received at the decision state 212, the process moves to a state 203 to digitally read the current temperature of the pressure sensor. As discussed previously, the readings from the pressure sensor vary with temperature, so a temperature reading is taken in order to more accurately calculate the media pressure. Once the temperature is digitally read at the state 203, the process 200 moves to a state 204 and reads the current digital pressure that has been derived from the analog output of the pressure sensor. The digital pressure is output from the A/D converter 106 (FIG. 4).

The process 200 then moves to a state 205 and uses the offset and temperature characteristics from state 202 to calculate a set of corrections for the sensor's offset, sensitivity, and for oscillator frequency of the PIC12C509 which can vary with temperature. By sensing temperature, the processor can correct its own oscillator errors with temperature, as it could with any component have temperature behaviors which could require correction. Since the sensor module is designed to output data in various formats (as shown in FIG. 5) two possible software paths are available from this point.

Thus, a decision is then made at a decision state 206 whether the desired output is in a digital or an analog format. If the desired output is in a digital format, the process 200 moves to a state 207 and converts the digital values to a pressure calculation. A digital output to an external device or a display, result in converting the pressure to the preferred units (i.e. English or Metric) then output the data in any desired format, such as RS-232, RS-422or RS-485. The process then moves to a state 208 wherein the pressure values are transmitted in an ASCII format to the desired recipient.

However if a decision is made at the decision state 206 that the sensor output will be in an analog format, the process 200 moves to a state 209 wherein the sensor reading is scaled to the appropriate analog voltage outputs for direct voltage out or current outputs using dual digital-to-analog converters and dual operational amplifiers for direct current out at a state 210.

Once a reading has been output at either state 208 or 210, the main system timer is checked at a state 210 for the appropriate wait time before initiating another read of the pressure sensor. The process 200 then moves to a decision state 212 to determine if the appropriate wait time has expired. If the wait time has not expired, the process 200 loops until the wait time has expired. Once a decision is made that the appropriate wait time has expired, the process 200 returns to the state 212 to determine if a request has been initiated for a sensor read.

For versions of the present embodiment capable of receiving either RS-485 or RS-232C signals, the microprocessor is programmed to not respond to the transmitting interface unless addressed. For example, upon Power-Up Reset, the microcontroller 110 configures itself to be in a communications receive mode. An address of the sensor would be requested on the line. Once the sensor ID is received, the microprocessor would instruct the A/D converter to perform one data acquisition cycle (or more if required) and broadcast the result on the system, in the transmit mode. After transmission, the microprocessor would instruct itself to return to a listening mode. The microprocessor would draw very low power and wait for its specific address to come across the communication lines.

The bi-directionality and listen/receive modes of this embodiment of the pressure sensor make a network of pressure sensors possible. Each sensor would be in communication serially with the other sensors, with the direction of the data bus dependent on the request for data and time for response dominating the direction of data and response times.

Temperature Compensation

There are numerous ways to compensate the sensor output for temperature. One such way is described by the equations below. However, the invention is not limited to this way of providing temperature compensation.

To complete the calculations of the measured pressure, several coefficients should be determined. First is the room temperature offset. This measurement is the sensor output at room temperature with no pressure applied. Next is the temperature sensitivity of offset (i.e. the sensor output with no pressure applied) as it varies with temperature. And finally, the sensitivity of the sensor over temperature. This is explained mathematically as:

(1) With no pressure applied:
Vout=Vo+Vo(T,V) where Vo =Offset at room temperature (23° C.) and Vo(T,V) is the offset change over temperature at an applied voltage (2) With pressure applied:
Vout=Vo+Vo(T,V)+Pressure (PSI)*K(T,V,PSI) where, K is the the sensitivity as a function of temperature and applied voltage and pressure These equations show that two quantities are required: Vo(T,V) and the sensitivity K(T,V,PSI). These values can be obtained in two ways, either by lot sensor behavior or individual sensor behavior testing. In either case, room temperature testing of the sensor is used to calculate the 23° C. offset and sensitivity data. If lot behavior of the sensor is not available, the sensor can be taken to temperature, the offset measured, and the resultant sensitivity measured by applying a specified pressure. These results thereafter provide the basics for calculating the required coefficients of offset and sensitivity as functions of temperature, and are stored in the microcontroller or serial memory for each particular sensor. One additional benefit from temperature-cycling the part is the benefit of calibrating the on-board digital temperature sensor. These sensors, typically very linear, have permanent offsets which can be removed during a temperature cycling of the sensor assembly.

Another factor in determining the sensitivities of the part to initial offsets and variations in temperature, is the total dynamic range of the system. Dynamic range of the analog to digital converter should not be exceeded during any excursion of pressure range or temperature. This condition normally requires the room temperature operation over the pressure excursions to be less than the dynamic range of the system. In the current embodiment, this range is approximately 3 Volts including instrumentation amplifier gain. The room temperature operation is thus to be generally in the 1–4 Volt range. The range from 0–1 and 4–5 Volts would then be advisable to contain any zero pressure offsets at the temperature extremes or maximum pressure readings at the temperature extremes, respectively.

While the invention has been described in connection with specific embodiments thereof, it will be understood that it is capable of further modification, and this application is intended to cover any variations, uses, or adaptations of the invention following, in general, the principles of the invention and including such departures from the present invention as would be understood to those in the art as equivalent and the scope and context of the present invention is to be interpreted as including such equivalents and construed in accordance with the claims appended hereto.

What is claimed is:

1. A sensor for detecting the pressure and temperature of a media, comprising:
   an outer housing;
   a tubular insert located inside the outer housing, said tubular insert has a first narrow end and a second widened end;
   a pressure sensor with a first pressure sensing surface and a second non-pressure sensing surface, said first pressure sensing surface mounted to the first end of the tubular insert for measuring the pressure of the media flowing into the second end;
   temperature sensing means being in thermal contact with said second non-pressure sensing surface of said pressure sensor for sensing temperature of the media;
   storage means communicating with said pressure sensor and temperature sensing means for storing a range of temperature offset information preestablished from said pressure sensor through a range of different pressure sensor temperatures; and
   a microcontroller in communication with the pressure sensor, the temperature sensing means and said storage means for reading the measured pressure and temperature and said storage means and outputting a temperature corrected pressure digital signal.

2. The pressure sensor of claim 1, wherein the outer housing is plastic.

3. The pressure sensor of claim 1, wherein the tubular insert is cylindrical.

4. The pressure sensor of claim 1, wherein the tubular insert is stainless steel.

5. The pressure sensor of claim 1, wherein said media is water or air.

6. The pressure sensor of claim 1, further comprising an analog to digital converter for converting the analog output of the pressure sensor to a digital output.

7. The pressure sensor of claim 1, further comprising a battery for providing power to the pressure sensor.

8. The pressure sensor of claim 1, further comprising a first circuit for detecting assertion of a wait signal and providing power to the pressure sensor in response to the wait signal.

9. The pressure sensor of claim 8, wherein the first circuit is responsive to software instructions embedded in the microcontroller.

10. The pressure sensor of claim 8, further comprising a second circuit for outputting the pressure measurement read by the pressure sensor in response to the wake signal.

11. The pressure sensor of claim 1, further comprising a digital Input/Output circuit for providing digital output to external devices.

12. The pressure sensor of claim 11, wherein the digital output format is RS-232 or RS-485.

13. A sensor for detecting the pressure and temperature of a media, comprising:
- an outer housing;
- a metallic tubular insert located inside the outer housing, wherein the tubular insert has a first end and a second end, said first end being wider than said second end;
- a pressure sensor with a first pressure sensing surface and a second non-pressure sensing surface, said first pressure sensing surface mounted to the first end of the tubular insert for measuring the pressure of the media flowing into the second end;
- temperature sensing means being in thermal contact with said second non-pressure sensing surface of said pressure sensor for sensing the temperature of the media.

14. The pressure sensor of claim 13, wherein the outer housing is made of a thermoplastic resin.

15. The pressure sensor of claim 13, wherein the tubular insert is a stainless steel hollow insert.

16. The pressure sensor of claim 13, further comprising a microcontroller in electrical communication with the pressure sensor.

17. The pressure sensor of claim 16, further comprising an analog to digital converter in communication with the pressure sensor for converting an analog signal from the pressure sensor into a digital signal.

18. A sensor for detecting the pressure of a media, comprising:
- an outer housing;
- a tubular insert located inside the outer housing, said tubular insert has a first widened end and a second narrow end;
- a pressure sensor having a front side and a back side, wherein the front side is in fluid contact with the first end of the hollow insert; and
- A printed circuit board haveng a microcontroller and being mounted to the back side of the pressure sensor.

19. The pressure sensor of claim 18, wherein the outer housing is made of plastic.

20. The pressure sensor of claim 18, wherein the tubular insert is stainless steel.

21. The pressure sensor of claim 18, wherein the microcontroller comprises instructions for outputting a pressure reading in a digital format.

22. The pressure sensor of claim 18, further comprising an analog to digital converter in communication with the pressure sensor for converting an analog signal from the pressure sensor into a digital signal.

* * * * *